(12) United States Patent
Jongmans et al.

(10) Patent No.: US 9,867,334 B2
(45) Date of Patent: Jan. 16, 2018

(54) CORN HEADER INCLUDING A KERNEL SENSOR AND A CONTROL UNIT FOR CONTROLLING DESK PLATES OF THE CORN HEADER

(71) Applicant: CNH Industrial America LLC, New Holland, PA (US)

(72) Inventors: Dré W. J. Jongmans, AG Klundert (NL); Bart M. A. Missotten, Herent (BE); Frederik Tallir, Esen (BE); Willem Vandamme, Ichtegem (BE); Karel M. C. Viaene, Moorslede (BE)

(73) Assignee: CNH Industrial America LLC, New Holland, PA (US)

( * ) Notice: Subject to any disclaimer, the term of this patent is extended or adjusted under 35 U.S.C. 154(b) by 89 days.

(21) Appl. No.: 14/924,158

(22) Filed: Oct. 27, 2015

(65) Prior Publication Data

US 2016/0113199 A1    Apr. 28, 2016

(30) Foreign Application Priority Data

Oct. 27, 2014   (BE) .................................. 2014/0794

(51) Int. Cl.
    *A01D 41/00*  (2006.01)
    *A01D 45/02*  (2006.01)
    *A01D 41/127* (2006.01)

(52) U.S. Cl.
    CPC ....... *A01D 45/021* (2013.01); *A01D 41/1273* (2013.01)

(58) Field of Classification Search
    CPC .. A01D 45/021; A01D 45/025; A01D 41/127; A01D 45/023; A01D 41/1271; A01D 41/1273
    USPC ............................................................ 56/62
    See application file for complete search history.

(56) References Cited

U.S. PATENT DOCUMENTS

| | | | |
|---|---|---|---|
| 3,126,690 A * | 3/1964 | Keller ................. | A01D 45/025 56/107 |
| 3,262,255 A * | 7/1966 | Karlsson ............. | A01D 45/025 56/107 |
| 3,271,940 A * | 9/1966 | Ashton ................ | A01D 41/141 56/105 |
| RE31,064 E * | 10/1982 | Shriver ............... | A01D 43/082 56/106 |
| 4,902,264 A | 2/1990 | Diekhans et al. | |
| 5,878,559 A * | 3/1999 | Cooksey ............. | A01D 45/023 56/104 |

(Continued)

*Primary Examiner* — Arpad Fabian-Kovacs
(74) *Attorney, Agent, or Firm* — Peter K. Zacharias; Patrick M. Sheldrake

(57) ABSTRACT

A corn header includes a plurality of harvesting units to separate corn ears from corn stalks. Each harvesting unit has a deck plate assembly, and an actuator assembly to adjust a width of a stalk receiving channel by adjusting a position of at least a deck plate of the deck plate assembly. A kernel sensor can generate a signal representative of the presence of kernels detached from the ears during the separation of the corn ears from the corn stalks by the harvesting units and a control unit to receive the signal from the kernel sensor and generate an actuator control signal for controlling the actuator assemblies of the plurality of harvesting units, thereby controlling the width of the stalk receiving channels of the harvesting units.

10 Claims, 3 Drawing Sheets

(56) References Cited

U.S. PATENT DOCUMENTS

| | | | |
|---|---|---|---|
| 6,226,969 B1* | 5/2001 | Becker | A01D 45/021 56/62 |
| 6,237,312 B1* | 5/2001 | Becker | A01D 45/021 56/119 |
| 6,591,145 B1* | 7/2003 | Hoskinson | A01D 41/127 460/1 |
| 7,584,663 B2 | 9/2009 | Missotten et al. | |
| 8,820,039 B2 | 9/2014 | Werning | |
| 9,232,693 B2* | 1/2016 | Hendrickson | A01D 45/025 |
| 2008/0092507 A1* | 4/2008 | Bollig | A01D 45/021 56/106 |
| 2011/0146218 A1* | 6/2011 | Carboni | A01D 45/021 56/62 |
| 2011/0173942 A1* | 7/2011 | Kowalchuk | A01D 45/021 56/62 |
| 2012/0029757 A1* | 2/2012 | Kowalchuk | A01D 45/021 701/34.2 |
| 2012/0204528 A1* | 8/2012 | Regier | A01D 45/025 56/62 |
| 2014/0053524 A1* | 2/2014 | Werning | A01D 45/021 56/62 |
| 2014/0230580 A1* | 8/2014 | Dybro | A01D 45/021 73/865 |
| 2015/0327440 A1* | 11/2015 | Dybro | A01D 75/00 73/862.541 |

* cited by examiner

CORN HEADER INCLUDING A KERNEL SENSOR AND A CONTROL UNIT FOR CONTROLLING DESK PLATES OF THE CORN HEADER

This application claims priority to Belgium Application BE2014/0794 filed Oct. 27, 2014, which is incorporated herein by reference in its entirety.

FIELD OF THE INVENTION

The invention relates to the field of combine harvesters for harvesting corn, and more specifically to controlling a harvesting unit of a corn header of such a harvester.

BACKGROUND OF THE INVENTION

Corn plants are typically planted in rows spaced a predetermined distance apart. Harvesting units of corn headers are spaced a corresponding distance apart so as to be capable of following the rows while inducting the corn plants. When entering and moving through a stand of corn, the harvesting units of the header are typically preceded by row dividers that separate the adjacent rows of plants for harvesting by the respective harvesting units. The harvesting units are configured and operable for receiving the stalks of the corn plants of the respective rows in succession, and removing the full or intact ears of corn, for conveying by other apparatus from the header to processing apparatus within the harvesting machine. Typically, the harvesting units can comprise a variety of devices operable for harvesting the corn ears from the stalks, including deck plates defining a stalk receiving channel, gathering chains having teeth operable for carrying the corn ears rearward to a conveying apparatus of the header and snapping rolls located in association with the deck plates for pulling the corn stalks downwardly. In a typical configuration, the gathering chains are located above the deck plates and the snapping rolls are located below. The snapping rolls are rotatable for pulling the corn stalk downwardly, through rearward moving fingers of the gathering chains, to bring the ears to bear against the top edges of the deck plates so as to be detached from the stalks thereby. The detached ears are then carried toward the rear of the header by the gathering chains for conveying by other apparatus into the harvesting machine, while the collapsed stalks are left on the field.

In a typical harvesting unit, the deck plates can be spaced a variety of distances apart. For instance, the spacing can be large such that a gap or space exists between the adjacent edge of the deck plate and the side of the stalks, on one or both sides of the stalks. Or, the spacing can be smaller, such that edges of the deck plates contact the sides and even pinch or squeeze the stalks. In the first instance, if the gap or space is large, an advantage is that more of the remaining plant residue or trash, e.g., leaves, stalks, husks, can fall through the enlarged channel so as not to build up in the harvesting unit, and not be conveyed into the harvester. But, a disadvantage is that corn ears may get stuck more easily between the deck plates. As a result, these ears may form an obstruction or trash build up for a next stalk entering the harvesting unit. Further, when such a corn ear remains stuck, a substantial amount of kernels will become detached until the ear is reduced in size and falls through the gap. As such, when the gap is set too large, considerable losses may occur. In the second instance, if the pinch force is too great, stalks may get caught between the deck plates and bunch up in the channel and be damaged or broken such that, again, ears are lost, and more trash may be retained and carried by the gathering chains into the header.

As proposed solutions to the problems set forth above, it is known for the deck plates to be movable laterally, e.g., using an actuator such as a hydraulic cylinder, to allow adjusting the width of the stalk receiving channel, from the operator cab based on observations and/or operator preferences, mainly, based on estimates of stalk diameter, and/or to achieve good stalk flow into the harvesting units. However, if the operator lacks experience, or is inattentive, the channel width can be too big or small, resulting in the above listed problems. It is also known for the deck plates to be spring mounted to bring the edges of the deck plates to bear against the largest diameter stalks currently located therein while exerting a pinching force. This provides a degree of automatic adjustment and can eliminate gaps or spaces between the edges of the deck plates and the stalks. However, this force will be strictly a function of the spring constant and the degree of compression or extension thereof, if working properly. As another problem, sugars from the stalks and dust adhered thereby to the plates and surrounding structure so as to reduce and even overcome the spring forces and inhibit free lateral adjusting movements of the plates, such that they can stick open too widely or too narrowly so as to undesirably affect the pinching force, disrupt stalk flow and ear removal, and the like.

It is therefore an object of the present invention to provide in an improved manner of controlling deck plate positioning of a corn header, thereby at least partly overcoming one or more of the shortcomings and problems mentioned above.

SUMMARY OF THE INVENTION

It is an object of the present invention to at least mitigate one or more of the aforementioned problems.

This object is achieved by a corn header for a combine harvester, the corn header comprising:
a plurality of harvesting units, the harvesting units being configured to separate corn ears from corn stalks, each harvesting unit comprising:
a deck plate assembly comprising a pair of deck plates that are spaced apart to define a stalk receiving channel having a width W;
an actuator assembly configured to adjust the width W of the stalk receiving channel by adjusting a position of at least one of the deck plates;
the corn header further comprising:
a kernel sensor configured to generate a kernel signal representative of the presence of kernels that are detached from the ears during the separation of the corn ears from the corn stalks by the harvesting units;
a control unit configured to receive the kernel signal from the kernel sensor and generate, based on the kernel signal, an actuator control signal for controlling the actuator assemblies of the plurality of harvesting units, thereby controlling the width W of the stalk receiving channels of the plurality of harvesting units.

The corn header according to the present invention comprises a plurality of harvesting units. Typically, such units are arranged in a row extending in a direction substantially perpendicular to the direction of movement of the combine harvester and spaced apart over a distance substantially corresponding to the distance between two adjacent rows of corn stalks that need to be harvested.

The harvesting units each comprises a deck plate assembly comprising a pair of deck plates that are spaced apart to define a stalk receiving channel having a width W. During harvesting, the stalk receiving channel is brought in line with a row of corn stalks. When a corn stalk is received by the stalk receiving channel, the corn ears can be separated from the corn stalk. This can e.g. be realised by pulling the corn stalks downward trough the stalk receiving channel, e.g. by means of a pair of snapping rolls that are mounted below the stalk receiving channel. As described above, in case the width W of the stalk receiving channel are either to too large or to small, this may have a large impact on the losses of the harvester. In particular, it has been devised by the inventors that, in case the width of the stalk receiving channel is too large, kernels are detached from the corn ears and are lost; the detached kernels are found to scatter around and end up on the ground. In case the width of the stalk receiving channel is too small, this may result in too much stalks and MOG (material other than grain) being retained and thus transported towards the rear, which may result in additional losses or an increased power consumption of a transporting system of the harvester, or which may result in a cleaning system of the harvester becoming loaded with the stalks and MOG.

In accordance with the present invention, the corn header is equipped with one or more kernel sensors that are configured to generate a signal representative of the presence of kernels that are detached from the ears during the separation of the corn ears from the corn stalks by the harvesting units.

As a first example of such a kernel sensor, a microphone may be applied. When, e.g. due to the application of a stalk receiving channel that is too large, kernels become detached to from the corn ears and are scattered around, they may impact on parts of the housing or frame of the harvesting unit. Such impacting may cause an audible noise which can be sensed by a microphone. In such embodiment, it may be advantageous to filter the sensed signal in order to eliminate other noise sources. As an example of such filtering, a band-pass filter can be applied which is tuned to pass noise that can be attributed to the impacting of the kernels and is tuned to block other sources.

As a second example of such a kernel sensor, a piezoelectric sensor can be mentioned. When such a sensor is impacted or hit by a kernel, a voltage signal is generated.

In accordance with the present invention, the harvesting units further comprises an actuator assembly to adjust the width W of the stalk receiving channel. Typically, hydraulic or pneumatic actuators can be applied in such an actuator assembly although other types of actuators such as electromagnetic actuators could be applied as well.

In accordance with the present invention, the actuator assemblies of the harvesting units are controlled by a control unit (e.g. a processor based control unit), the control unit receiving a signal from the one or more kernel sensors of the corn header. Based on this signal, the control unit may generate an actuator control signal for controlling the actuator assemblies of the harvesting units, thus enabling the width W of the stalk receiving channel to be adjusted.

As such, when the one or more kernel sensors detect the presence of scattering kernels in the harvesting unit, a signal representative of the presence of the detached kernels is provided to the control unit, whereupon the control unit may generate an actuator control signal to operate the actuators such that the width W of the stalk receiving channel is adjusted.

In an embodiment of the present invention, a combine harvester including a corn header according to the invention is provided.

In an embodiment of such a combine harvester, the control unit of the corn header may be configured to receive a further signal representative of an operating condition of the combine harvester and to generate, based on both the signal obtained from the kernel sensor and the further signal representing the operating condition, an actuator control signal for controlling the actuator assemblies of the plurality of harvesting units, thereby controlling the width W of the stalk receiving channels of the plurality of harvesting units. to which the corn header is mounted. As an example of such operating condition, a power consumption of the combine harvester or a transport-processing device thereof, can be mentioned.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

Figure 1:
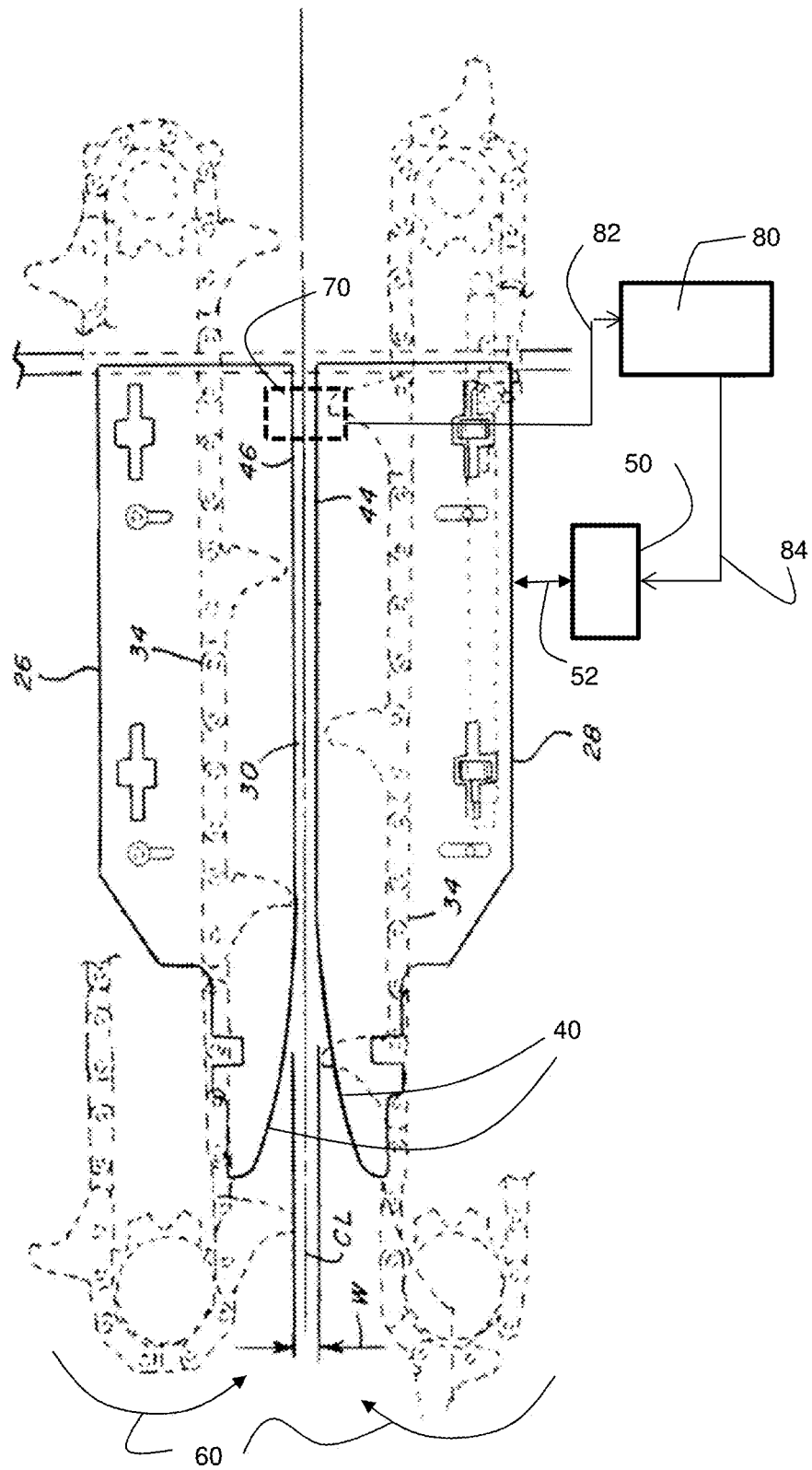
FIG. 1 schematically shows a top view of a harvesting unit as can be applied in a corn header according to the present invention.

FIG. 1 schematically shows an harvesting unit 10 as can be applied in a corn header according the present invention. The harvesting unit 10 comprises a deck plate assembly comprising a pair of deck plates 26, 28 that are spaced apart to define a stalk receiving channel 30 that is bound by edges 44, 46 of the deck plates 26, 28 and has a width W. During operation, a row of stalks is received along the centreline CL via the curved edges 40 of the deck plates 26, 28.

FIG. 1 further shows an actuator assembly comprising an actuator 50, the actuator being configured to exert a force on the deck plate 28 (indicated by the arrow 52), in order to adjust a position of the deck plate, thereby adjusting the width W of the stalk receiving channel 30. As an alternative to using only a single actuator 50 to adjust the width W of the stalk receiving channel 30, a plurality of actuator may be applied as well, acting on one of the deck plates or on both deck plates. FIG. 1 further partly shows, in dotted line, a gathering chain assembly 34 which, during use, rotates as indicated by the arrows 60, thereby transporting the removed corn ears to the back of the corn header. FIG. 1 further schematically shows, in dotted line, a kernel sensor 70. In the embodiment as shown, the kernel sensor 70 is arranged at the rear of the stalk receiving channel 30 as defined by the edges 46, 44, and below the deck plates, see also FIG. 2. In accordance with the present invention, the kernel sensor 70 is configured to generate a signal representative of the presence of scattered kernels, i.e. kernels that are detached from the ears during the separation of the corn ears from the corn stalks. The kernel sensor 70 is further configured to provide the signal to a control unit 80 of the corn header, as indicated by the arrow 82. The sensor signal 82 can e.g. be provided to an input terminal of the control unit 80. The control unit 80 may e.g. be a processor based control unit, configured to generate, based on the sensor signal 82, an actuator control signal 84 for controlling the actuator 50 of the actuator assembly of the harvesting unit.

Typically, a corn header comprises a plurality of harvesting units arranged in a row to harvest, during use, a respective plurality of stalks. The number of harvesting units in such a row of harvesting units may e.g. range from 10 to 30.

In an embodiment of the corn header according to the present invention, a kernel sensor is provided in a harvesting unit arranged in or near the middle of the row of harvesting units of the corn header. Such harvesting unit, also referred to as the central harvesting unit, may typically be directly in front of the cabin of the harvester to which the corn header is connected during use. In such embodiment, the sensor signal of the kernel sensor (applied to the central harvesting unit) is applied by the control unit of the corn header to generate actuator control signals for the actuator assemblies of the plurality of harvesting units. In such arrangement, each actuator assembly may e.g. receive the same control signal, thereby controlling the width W of the stalk receiving channels of the plurality of harvesting units to substantially the same size.

Alternatively, two or more kernel sensors may be provided on the corn header, each sensor providing a signal to the control unit of the corn header, whereby the control unit may generate either a common actuator control signal (i.e. to control all the actuators of the actuator assemblies in substantially the same manner), or dedicated control signals for the actuator assemblies.

As an example of the latter arrangement, each harvesting unit may be equipped with its own kernel sensor thus enabling that the actuator assembly of each harvesting unit is controlled based on the sensor signal of the kernel sensor of that harvesting unit. Note that in such an arrangement, each harvesting unit may be equipped with its own control unit for processing the kernel sensor signal and generating a dedicated actuator control signal. In such arrangement, the width W of each of the stalk receiving channels may thus be set or controlled individually.

Alternatively, all sensor signals may be provided to a central control unit configured to process the sensor signals and generate, based on the signals, dedicated actuator control signals for the plurality of actuator assemblies, thus enabling a dedicated control of the width W of each of the stalk receiving channels.

Figure 2:
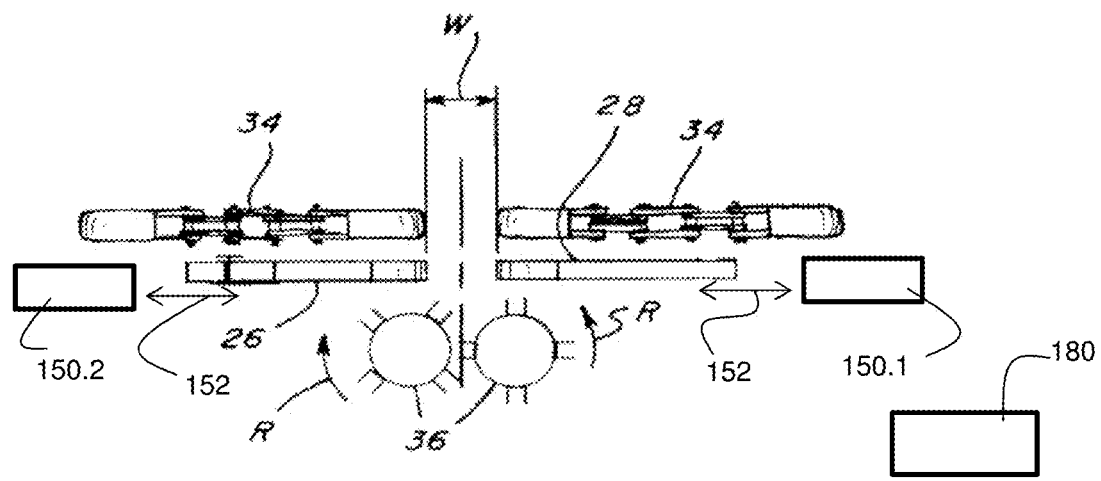
FIG. 2 schematically shows a front view of a harvesting unit as can be applied in a corn header according to the present invention.

FIG. 2 schematically shows a front view of a harvesting unit as can be applied in a corn header according to the present invention. The arrangement as shown comprises a deck plate assembly comprising a pair of deck plates 26, 28 that are spaced apart to define a stalk receiving channel having a width W. Arranged above the deck plates is a gathering chain assembly 34 for gathering the detached corn ears and transporting them to the back of the corn header. Below the deck plates 26, 28, a pair of snapper rolls 36 is provided which, during use, rotate as indicated by the arrows R, thereby pulling the corn stalks downward through the stalk receiving channel. FIG. 2 further schematically shows a pair of actuators 150.1, 150.2 of an actuator assembly which are configured to displace the deck plates 26, 28 in the direction indicated by the arrows 152.

In accordance with the present invention, the actuators 150.1, 150.2 are controlled by an actuator control signal provided by a control unit 180, the actuator control signal being based on a sensor signal received from a kernel sensor as e.g. shown in FIG. 1.

In accordance with the present invention, a kernel sensor is applied that is configured to generate a signal representative of the presence of kernels that are detached from the ears during the separation of the corn ears from the corn stalks by the harvesting units.

As described above, in case the width of the stalk receiving channel is too large, corn ears may partly be pulled through the stalk receiving channel, resulting in kernels being detached and scattered around. These kernels may e.g. impact on a housing of the harvesting unit and will ultimately end up on the soil, resulting in a loss of the kernels.

When such kernels are scattered, the impacting on a housing or frame of the corn header may be noticed. As such, the impacting of the scattered kernels may be detected using a sensor.

Typically, the impacting of the kernels can be heard, i.e. results in an audible signal. Such an audible noise can e.g. be sensed by a microphone. As such, as a first example of a kernel sensor as can be applied in the present invention, a microphone can be mentioned. As there are various other sources of audible noise on a combine harvester, it may be advantageous to filter the signal that is picked up by the microphone, in order to eliminate those other noise sources. As an example of such filtering, a band-pass filter can be applied which is tuned to pass noise that can be attributed to the impacting of the kernels and is tuned to block other sources.

In an embodiment, instead of relying on the impacting of the kernels on the housing of the harvesting units, a dedicated structure, e.g. a plate shaped structure, may be suspending at an appropriate position to receive the scattered kernels. In such arrangement, the microphone may be configured to only capture the noise generated by the suspended structure.

Figure 3:
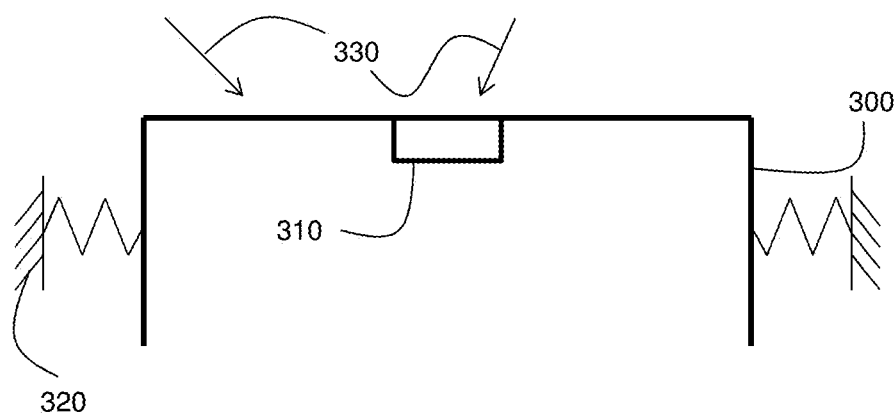
FIG. 3 schematically shows a kernel sensor as can be applied in a corn header according to the present invention.

As a second example of a kernel sensor that can be applied in a corn header according to the present invention, a piezo-electric sensor can be mentioned. Such a piezo-electric sensor comprises a piezo-electric element, e.g. a piezo-electric crystal, which generates, upon deformation, a voltage across the element. As such, when such a piezo-electric sensor is caused to deform, e.g. when impacted or hit by a kernel, a voltage signal is generated. In an embodiment, the piezo-electric sensor comprises a plate or plate-like structure to which the piezo-electric element is mounted. Such an arrangement is schematically shown in FIG. 3. The piezo-electric sensor as shown comprises a plate-like structure 300 to which a piezo-electric element 310 is mounted. The structure 300 may e.g. be mounted to a housing or frame 320 of the harvesting unit where the sensor is applied. When the structure 300 is hit by scattered kernels (indicated by the arrows 320), the structure and the piezo-electric element 310 will deform, i.e. the structure will vibrate, causing the element to generate a voltage. In order to increase the sensitivity of the sensor, it may be advantageous to ensure that the structure vibrates, upon impacting, at a frequency at or near an eigenfrequency of the piezo-electric element 310. In an embodiment, the piezo-electric sensor may also include a damping material to dampen the occurring vibrations of the sensor.

As a third example, an accelerometer can be mentioned. When such accelerometer (or the housing to which the accelerometer is mounted) is impacted by a kernel, the displacement of the accelerometer results in a signal being generated, the signal being representative of the presence of detached kernels. Note that the aforementioned piezo-electric sensor may be considered an example of an accelerometer. Further, a filtering as described above may also be applied to the signal of the accelerometer or the piezoelectric sensor, in order to eliminate or reduce vibrations caused by other sources.

Figure 4A:
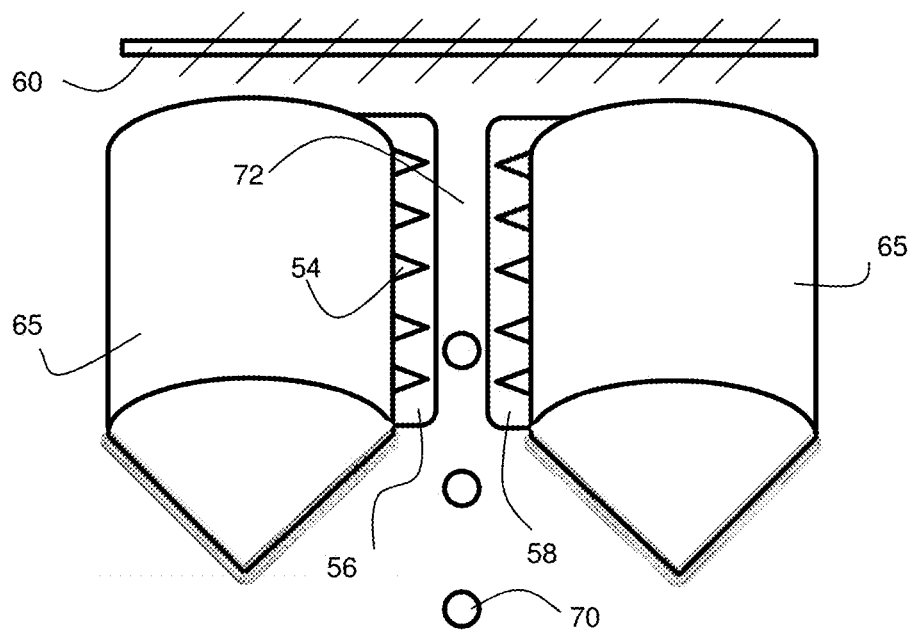
FIGS. 4a and 4b schematically show a further embodiment of a harvesting unit as can be applied in a corn header according to the present invention.
Figure 4B:
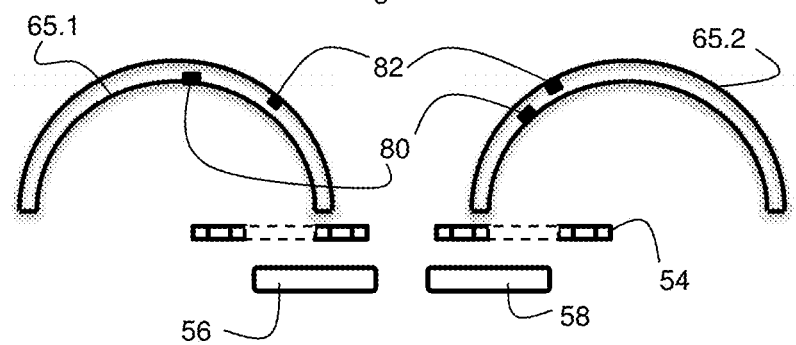

In an embodiment of the present invention, the corn header further comprises a plurality of shields (also known or referred to as hoods) which are typically arranged to guide the stalks to the stalk receiving channels and which cover a part of the deck plates that does not define the stalk receiving channel. FIG. 4a schematically shows a top view of part of such a corn header, FIG. 4b schematically shows a cross-sectional front view of the same part. FIGS. 4a and 4b schematically show a deck plate assembly comprising a pair of deck plates 56, 58 that are spaced apart to define a stalk receiving channel 72. Arranged above the deck plates is a gathering chain assembly 54 for gathering the detached corn ears and transporting them to the back of the corn header, e.g. towards an auger 60. FIGS. 4a and 4b further show a pair of shields or hoods 65 that are configured to guide a row of stalks 70 towards the stalk receiving channel 72.

In the embodiment as shown, the hoods 65 are double walled hoods.

In an embodiment of the corn header according to the present invention, one or more kernel sensors are mounted to the hoods 65. FIG. 4b schematically shows the mounting of two microphones 80 and two accelerometers 82 on an internal surface of the double walled hoods. In the embodiment as shown, the microphones are mounted to an internal surface of the inner wall 65.1 of the hoods, whereas the accelerometers are mounted to an internal surface of the outer wall 65.2 of the hoods 65.

With respect to the positioning of the kernel sensor or kernel sensors, it can be mentioned that there are only a limited number of passages or gaps through which the scattered or detached kernels can get lost. An appropriate positioning of the one or more kernel sensors may be found in an experimental manner, thereby monitoring the sensor signal for different sensor positions. As an example of such favourable position, the kernel sensor can be mounted at a rear end or near the middle of the stalk receiving channel, below the deck plates.

In an embodiment, the present invention provides in a combine harvester comprising a corn header according to the present invention. Such combine harvester may typically include several devices for transporting and processing the harvested ears.

Such transporting devices may e.g. include one or more augers, conveyer belts, etc.

Processing devices may e.g. include thrashing or cleaning systems.

In an embodiment of the combine harvester according to the present invention, the control unit of the corn header is further configured to receive a further signal representative of an operating condition of the combine harvester, e.g. an operating condition of any of the transporting or processing devices of the combine harvester. As described above, when the stalk receiving channel is set at a width W which is too large, kernels can become detached and will scatter about. These kernels can be detected by any of the kernel sensors as described above. Upon receipt of a signal indicating the presence of scattering or detached kernels, the control unit as applied in the corn header according to the present invention will generate an actuator control signal to reduce the width W of the stalk receiving channel. When the width W of the stalk receiving channel is reduced, the detaching of kernels of the corn ears is reduced. When the width of the stalk receiving channel is set too narrow, the issue of the detaching of kernels may be solved or reduced, but other adverse effects may occur. When the width of the stalk receiving channel is too small, too much stalks and MOG may be conveyed into the harvester. As a result, the power consumption of the transporting and/or processing devices may increase. As such, when an excessive or above-normal power consumption is noted, this may be an indication that the width of the stalk receiving channel is too small. Typically, the harvested crop, i.e. the corn ears and MOG that is gathered (e.g. by means of auger 60 as shown in FIG. 4a), undergoes various processing steps including a threshing/separation step to separate the grains from the ear, and a cleaning step to clean the grains and gather the grains towards a grain tank. By observing the power consumption of the threshing/separating device, one can thus obtain an indication of the losses occurring during the threshing/separating step. As such, in an embodiment, the control unit of the corn header according to the invention may be configured to receive a further signal representative of a power consumption of the combine harvester, e.g. of a transport or processing device of the combine harvester to which the corn header is mounted or a central drive of the harvester.

In such embodiment, the control unit may be configured to generate, based on both the signal obtained from the kernel sensor and the further signal representing the power consumption, an actuator control signal for controlling the actuator assemblies of the plurality of harvesting units, thereby controlling the width W of the stalk receiving channels of the plurality of harvesting units.

In such an arrangement, an optimum can be realised taking into account both losses in the corn header and losses in the combine harvester to which the corn header is mounted.

In an embodiment, such an optimum may be realised by taking into account the losses in the corn header (observed by means of the above described kernel sensor) and the losses in the threshing/separating device of the harvester. In such embodiment, the power consumption of the threshing/separating device may provide an indication of these losses.

Note that, as an alternative, other operational parameters of the combine harvester may be equally suited as an indication that the width of the stalk receiving channel is too small. As an example, in case the combine harvester is provided with a cleaning system including a loss sensor, such a loss sensor (which may e.g. be piezo-based sensor, similar to the sensor as described above) may be used to generate the mentioned further signal indicating that the operating conditions of the combine harvester are less than optimal.

In an embodiment of the combine harvester according to the present invention, the sensor signal (e.g. the audible noise signal captured by a microphone) can made available in the cabin of the combine harvester, thus providing to the operator an audible signal representing the corn header losses.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The invention claimed is:

1. A corn header for a harvester, comprising
a plurality of harvesting units, each configured to separate corn ears from corn stalks, each of the plurality of harvesting units comprising:
a deck plate assembly comprising a pair of deck plates which are spaced apart to define a stalk receiving channel having a width; and
an actuator assembly configured to adjust the width of the stalk receiving channel by adjusting a position of at least one of the deck plates;
a kernel sensor configured to generate a kernel signal representative of a presence of kernels that are detached from the ears during the separation of the corn ears from the corn stalks by the harvesting units; and
a control unit configured to receive the kernel signal from the kernel sensor, to receive an operating condition signal indicative of an operating condition of the harvester, the operating condition comprising a power consumption of the harvester, and to generate, based on the kernel signal and the operating condition signal, an actuator control signal for controlling the actuator assemblies of the plurality of harvesting units, to control the width of the stalk receiving channels of the plurality of harvesting units.

2. The corn header according to claim 1, wherein the kernel sensor comprises a microphone.

3. The corn header according to claim 1, wherein the kernel sensor comprises a piezo-electric sensor.

4. The corn header according to claim 1, wherein the kernel sensor is mounted in a central harvesting unit of the corn header.

5. The corn header according to claim 1, wherein each of the plurality of harvesting units further comprises:
snapper rolls configured to pull the corn stalks as received in the stalk receiving channel downward; and
gathering chains configured to transport the corn ears that are separated from the corn stalks towards a rear end of the corn header.

6. The corn header according to claim 1, wherein the actuator assembly of each of the plurality of harvesting units comprise one or more hydraulic, pneumatic or electromagnetic actuators.

7. The corn header according to claim 1, wherein the kernel sensor is provided at a rear end of the stalk receiving channel of the deck plate assembly of one of the plurality of harvesting units, below the deck plates.

8. An agricultural harvesting system comprising:
a combine harvester; and
a corn header attached to a forward portion of the combine harvester, the corn header comprising:
a plurality of harvesting units, each configured to separate corn ears from corn stalks, each of the plurality of harvesting units comprising:
a deck plate assembly comprising a pair of deck plates which are spaced apart to define a stalk receiving channel having a width; and
an actuator assembly configured to adjust the width of the stalk receiving channel by adjusting a position of at least one of the deck plates;
a kernel sensor configured to generate a kernel signal representative of a presence of kernels that are detached from the ears during the separation of the corn ears from the corn stalks by the harvesting units; and
a control unit configured to receive the kernel signal from the kernel sensor, to receive an operating condition signal indicative of an operating condition of the combine harvester, the operating condition comprising a power consumption of the combine harvester, and to generate, based on the kernel signal and the operating condition signal, an actuator control signal for controlling the actuator assemblies of the plurality of harvesting units, to control the width of the stalk receiving channels of the plurality of harvesting units.

9. The agricultural harvesting system according to claim 8, wherein the power consumption is a power consumption of a threshing/separating device of the combine harvester.

10. The combine harvester according to claim 8, wherein the combine harvester further comprises a cleaning system including a loss sensor, wherein the operation condition further includes losses of the cleaning system and wherein the loss sensor is configured to generate a further signal representative of the losses of the cleaning system.

* * * * *